US011528150B1

(12) United States Patent
Stapleton (10) Patent No.: US 11,528,150 B1
(45) Date of Patent: Dec. 13, 2022

(54) REAL-TIME CERTIFICATE PINNING LIST (RTCPL)

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 331 days.

(21) Appl. No.: 16/682,714

(22) Filed: Nov. 13, 2019

(51) Int. Cl.
    *H04L 9/32* (2006.01)
    *H04L 9/08* (2006.01)

(52) U.S. Cl.
    CPC .......... *H04L 9/3268* (2013.01); *H04L 9/0852* (2013.01); *H04L 9/3242* (2013.01); *H04L 9/3247* (2013.01)

(58) Field of Classification Search
    CPC ... H04L 9/3268; H04L 9/0852; H04L 9/3242; H04L 9/3247
    See application file for complete search history.

(56) References Cited

U.S. PATENT DOCUMENTS

| | | | | |
|---|---|---|---|---|
| 9,774,590 | B1 * | 9/2017 | Bronshtein | H04L 63/06 |
| 9,888,037 | B1 * | 2/2018 | Sharifi Mehr | H04L 63/205 |
| 10,356,087 | B1 * | 7/2019 | Vetter | H04L 63/0853 |
| 10,454,689 | B1 * | 10/2019 | Sharifi Mehr | H04L 63/166 |
| 10,511,448 | B1 * | 12/2019 | Brinskelle | H04L 63/126 |
| 10,680,806 | B1 * | 6/2020 | Kaliski, Jr. | H04L 63/0435 |
| 10,708,256 | B1 * | 7/2020 | Kane-Parry | H04L 63/061 |
| 10,742,420 | B1 * | 8/2020 | Griffin | H04L 9/0861 |
| 10,853,057 | B1 * | 12/2020 | Bowerman | G06F 21/572 |
| 2004/0208316 | A1 * | 10/2004 | Wack | H04L 9/0869 380/44 |
| 2007/0011459 | A1 * | 1/2007 | Stapleton | G06Q 20/382 713/178 |
| 2012/0179903 | A1 * | 7/2012 | Arnold | H04L 9/3247 713/155 |
| 2013/0083926 | A1 * | 4/2013 | Hughes | H04L 9/3247 380/278 |
| 2013/0325823 | A1 * | 12/2013 | Resch | H04L 63/0823 707/695 |

(Continued)

FOREIGN PATENT DOCUMENTS

| | | | | |
|---|---|---|---|---|
| FR | 3102322 A1 * | 4/2021 | | H04L 9/3268 |
| WO | WO-2017146714 A1 * | 8/2017 | | H04L 63/08 |
| WO | WO-2018157247 A1 * | 9/2018 | | H04L 9/3268 |

OTHER PUBLICATIONS

Paul Black, Be Careful Who You Trust: Issues with the Public Key Infrastructure, 2014 Fifth Cybercrime and Trustworthy Computing Conference, pp. 12-21 (Year: 2014).*

*Primary Examiner* — Shahriar Zarrineh
(74) *Attorney, Agent, or Firm* — Foley & Lardner LLP (57) ABSTRACT

Examples described herein relate to systems, apparatuses, methods, and non-transitory computer-readable medium for maintaining, by an authoritative server, a plurality of pinned certificates. The authoritative server sends a certificate pinning list (CPL) to a client system. The CPL is a list of the plurality of pinned certificates each of the plurality of pinned certificates is associated with a corresponding one of host systems different from the authoritative server. The client system uses the plurality of pinned certificates in cryptographic processes involving the host systems.

20 Claims, 3 Drawing Sheets

(56) References Cited

U.S. PATENT DOCUMENTS

| | | | |
|---|---|---|---|
| 2016/0050200 A1* | 2/2016 | Yu | H04L 63/0823 |
| | | | 726/10 |
| 2016/0316025 A1* | 10/2016 | Lloyd | H04L 67/51 |
| 2017/0054708 A1* | 2/2017 | Zaw | H04L 63/0442 |
| 2017/0230355 A1* | 8/2017 | Su | H04L 63/0823 |
| 2017/0279619 A1* | 9/2017 | Yang | H04L 9/006 |
| 2017/0310647 A1* | 10/2017 | Hu | G06F 21/33 |
| 2018/0013753 A1* | 1/2018 | Bronshtein | H04L 63/06 |
| 2018/0262339 A1* | 9/2018 | Kazin | H04L 9/14 |
| 2018/0262472 A1* | 9/2018 | Frederick | H04L 9/0819 |
| 2018/0268386 A1* | 9/2018 | Wack | H04L 9/085 |
| 2018/0288062 A1* | 10/2018 | Goyal | H04L 63/1408 |
| 2018/0309795 A1* | 10/2018 | Ithal | H04L 63/1408 |
| 2018/0322538 A1* | 11/2018 | Linnamäki | G06Q 30/0277 |
| 2018/0332003 A1* | 11/2018 | Deriso | H04L 63/0823 |
| 2019/0165950 A1* | 5/2019 | Ibrahim | G06F 16/23 |
| 2019/0182236 A1* | 6/2019 | Rangaraj | H04L 63/0823 |
| 2019/0319797 A1* | 10/2019 | Suresh | H04L 9/0869 |
| 2019/0372783 A1* | 12/2019 | Martinez | H04L 9/321 |
| 2019/0379549 A1* | 12/2019 | Sundar | H04W 12/37 |
| 2020/0236093 A1* | 7/2020 | Bannister | H04L 9/3263 |
| 2020/0403811 A1* | 12/2020 | Pavlou | H04L 63/168 |
| 2021/0108499 A1* | 4/2021 | Aarsland | E21B 44/00 |
| 2022/0182413 A1* | 6/2022 | Benson | H04L 9/085 |

\* cited by examiner

REAL-TIME CERTIFICATE PINNING LIST (RTCPL)

BACKGROUND

Certificate pinning refers to a client system associating a specific certificate (e.g., a specific X.509 certificate) with a host, thus enabling the client system to trust and use that certificate. Traditionally, a client system performs certificate validation by walking the certificate chain from the end-entity (EE) certificate to the root certification authority (CA) certificate. A public key infrastructure (PKI) includes multiple tiers or levels. In one example, a PKI includes a root CA, an issuing CA, and one or more intermediate CAs therebetween. The certificate chain includes a link from the EE to an issuing CA, a link from the issuing CA to an intermediate CA, and a link from the intermediate CA to the root CA. The issuing CA is trusted by the intermediate CA. The intermediate CA is trusted by the root CA.

In the example in which the client system pins the root CA certificate, the client system implicitly trusts any intermediate CA operating under the policy domain of that root CA. In some cases, some untrustworthy intermediate CAs operating under the policy domain of a root CA can be trusted by the client system if the client system pins that root CA certificate, thus creating a security risk.

In the example in which the client system pins the intermediate CA certificate, the client system implicitly trusts any issuing CA operating under the policy domain of that intermediate CA. The intermediate CA may correspond to entities such as but not limited to, infrastructure, email systems, transport layer security (TLS), and so on. Pinning the intermediate CA certificate is narrower in scope as compared to pinning the root CA certificate, although some untrustworthy issuing CAs operating under the policy domain of the an intermediate CA can nevertheless be trusted by the client system if the client system pins that intermediate CA certificate, thus still posing a security risk.

In the example in which the client system pins the issuing CA certificate, the client system implicitly trusts any EE certificate operating under the policy domain of the issuing CA. In other words, the client system accepts any certificate issued by that issuing CA, as the client system assumes that the issuing CA has vetted the certificates that the issuing CA issues. However, some of the certificates issued by the issuing CA can be likewise untrustworthy. Accordingly, despite the narrower scope, security risk is still present.

In the example in which the client system pins the EE (or leaf) certificate, the client system explicitly trusts only the EE certificate, which may be preferred given that pinning the EE certificate has the narrowest scope and poses the least security risk. Typically, a large number of EE certificates needs to be pinned or re-pinned by the client system, for example, in executing a secure digital financial transaction for which the client system needs to connect to multiple service providers (which may have a large number of EE certificates that need to be pinned or re-pinned). It is therefore difficult for the client system to manage pinning of the large number of EE certificates.

Furthermore, the EE certificate lifecycle may not match or coincide with a lifecycle of a client application executed by the client system. For example, in the event that an original EE certificate expires, the client application needs to re-pin a new certificate in a same secure manner in which the original EE certificate was pinned. Many certificates are pinned within a software development lifecycle (SDLC) such that once a client application is deployed in the client system, re-pinning a new certificate is problematic in the situation in which the EE certificate lifecycle does not match or coincide with the lifecycle of the client application. As such, an application release is needed to achieve a certificate re-pin, which is inefficient. In addition, although the EE certificate can be re-pinned remotely, there is the risk that a hacker can introduce a malicious, wrong certificate in the remote re-pinning process.

SUMMARY

In some arrangements, a method for managing certificate pinning for a client system includes receiving, by a client system from an authoritative server, a certificate pinning list (CPL). The CPL is a list of a plurality of pinned certificates. Each of the plurality of pinned certificates is associated with a corresponding one of a plurality of host systems different from the authoritative server. The method further includes using, by the client system, the plurality of pinned certificates in cryptographic processes involving the plurality of host systems.

In some arrangements, a non-transitory computer-readable medium storing computer-readable instructions such that, when executed, causes a processor of a client system to receive, from an authoritative server, a CPL. The CPL is a list of a plurality of pinned certificates. Each of the plurality of pinned certificates is associated with a corresponding one of a plurality of host systems different from the authoritative server. The processor further uses the plurality of pinned certificates in cryptographic processes involving the plurality of host systems.

In some arrangements, a method for managing certificate pinning for a client system includes maintaining, by an authoritative server, a plurality of pinned certificates. Each of the plurality of pinned certificates is associated with a corresponding one of a plurality of host systems different from the authoritative server. The method further includes sending, by the authoritative server to a client system, a CPL. The CPL is a list of the plurality of pinned certificates. The client system uses the plurality of pinned certificates in cryptographic processes involving the plurality of host systems.

In some arrangements, a non-transitory computer-readable medium storing computer-readable instructions such that, when executed, causes a processor of an authoritative server to maintaining a plurality of pinned certificates, each of the plurality of pinned certificates being associated with a corresponding one of a plurality of host systems different from the authoritative server, and sending, to a client system, a CPL. The CPL is a list of the plurality of pinned certificates. The client system uses the plurality of pinned certificates in cryptographic processes involving the plurality of host systems.

These and other features, together with the organization and manner of operation thereof, will become apparent from the following detailed description when taken in conjunction with the accompanying drawings.

DETAILED DESCRIPTION

Arrangements described herein relate to managing certificate pinning in a real-time environment. In particular, the arrangements described herein can be implemented on a client system (e.g., a mobile computing device such as a smart phone, a server, a browser, and so on) that needs to pin a certificate (e.g., an X.509 certificate) in order to use a public key of the certificate for a subsequent cryptographic process (e.g., a cryptographic process of a client application) executed on the client system.

In some implementations, a client system (e.g., a client application thereon) may initiate multiple connections such as but not limited to, TLS connections with one or more web servers (e.g., hosts), such that a certificate for each of the multiple TLS connections needs to be pinned by the client system. For example, before a TLS connection can be established between a client system and a web server, the client system receives a TLS certificate of the web server from the web server and compares the TLS certificate received from the web server with the pinned certificate for the web server. In response to determining that the received TLS certificate is the same as the pinned certificate, the received TLS certificate is validated. In response to the received TLS certificate being validated, the client system connects to only that particular web server via the TLS connection, and the public key of the received TLS certificate is used for cryptographic processes in relation to the TLS connection. That is, the public key of the received TLS certificate is used to encrypt data transmitted between the client system and the web server via the TLS connection.

In some implementations, before signed software (code) can be executed (e.g., launch, run, and so on) by a client system (e.g., a client application thereon), the client system needs to verify a code signature of the signed software, for example, by validating a code signing certificate of a software source (e.g., a software manufacturer, software provider, and so on). For example, before signed software (code) can be executed by a client system, the client system receives a code signing certificate from the software source and compares the received code signing certificate with a pinned certificate. In response to determining that the received code signing certificate is the same as the pinned certificate, the received code signing certificate is validated. In response to the received code signing certificate being validated, the client system trusts only software from that software source and executes the signed software (code).

Given that in the certificate validation process, the received certificates need to be compared with pinned certificates, the pinned certificates need to be up-to-date. In some situations, origins of certificates may vary such that the client system cannot sufficiently keep an up-to-date list of pinned certificates. In one example in which the client system connects to numerous TLS sites, certificates of some of the TLS sites may not be known in advance and therefore cannot be pinned by the client system in advance. In another example in which an expired certificate of a TLS site is replaced, the new certificate may not be known by the client system yet and therefore cannot be pinned in advance. In yet another example in which a service provider for a TLS site is changed to a new service provider, a certificate for the new service provider may not be known by the client system yet and therefore cannot be pinned in advance.

In yet another example in which the client system receives signed software (code) from numerous software sources, the certificates of some of the numerous software sources may not be known by the client system yet and therefore cannot be pinned in advance. In yet another example in which an expired certificate of a software source is replaced, the new certificate may not be known by the client system yet and therefore cannot be pinned in advance. In yet another example in which a software source for a signed software (code) is changed to a new software source, a certificate for the new software source may not be known by the client system yet and therefore cannot be pinned in advance. Accordingly, given the origins of the certificates are constantly in flux, it is difficult for a client system to maintain an up-to-date list of pinned certificates.

The arrangements disclosed herein relate to a certificate pinning list (CPL) that allows a client system to adapt to the constant changes to certificates for various servers or software source. In some arrangements, an authoritative server or site provides the CPL, which is a current, real-time list of pinned certificates, to the client system. Given that the CPL is a current, real-time list of pinned certificates, the CPL can be referred to as a RTCPL.

The CPL can be digitally signed by the authoritative server in some examples. In some examples, the CPL can be encrypted by the authoritative server in addition to being digitally signed. One or more certificates of the authoritative server (referred to herein as authoritative server certificates) can be used to verify a cryptographic signature (e.g., a digital signature, a symmetric-base Message Authentication Code (MAC) or Hash-based Message Authentication Code (HMAC), and so on) of the authoritative server, decrypt the encrypted CPL, and so on. For example, responsive to receiving of the digitally signed CPL, the client system verifies the CPL signature using the one or more authoritative server certificates. In the example in which the digitally signed CPL is also encrypted, responsive to receiving the CPL, the client system also decrypts the CPL using the one or more authoritative server certificates. Accordingly, the authoritative server certificates are the only primary pinned certificates needed by the client system to obtain the pinned certificates included in the CPL. In other words, given that the authoritative server is a trusted authority for pinned certificates, the client system needs to validate only the authoritative server certificates of the authoritative server to access the pinned certificates for other sites, servers, software sources, and so on that are needed by the client system.

In some examples, key management can establish a symmetric key or an asymmetric key for encrypting and decrypting the CPL using any suitable key transport scheme or a key agreement scheme defined in X9.73 Cryptographic Message Syntax (CMS), including Post-Quantum Cryptography (PQC). In some examples, the symmetric key can be established using a pre-shared key (PKS) scheme.

Figure 1:
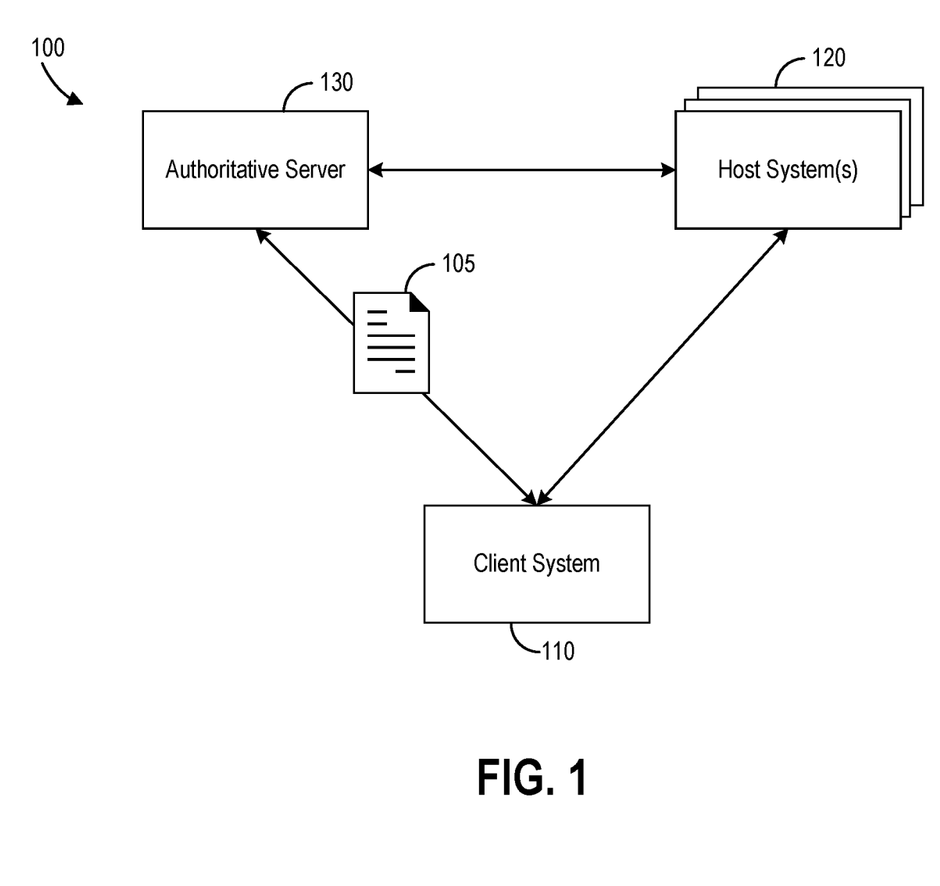
FIG. 1 is a diagram of a system for managing certificate pinning in real-time, according to some arrangements.

FIG. 1 is a diagram of a system 100 for managing certificate pinning in real-time, according to some arrangements. Referring to FIG. 1, the system 100 includes at least a client system 110, host systems 120 (each of which can be referred to as a host system 120), an authoritative server 130, and so on. As described herein, the system 100 allows real-time management of certificate pinning by providing pinned certificates as a CPL 105 to client systems (e.g., the client system 110) that do not or cannot know, in advance (before validation), all certificates upon which the client systems rely. The system 100 also reduces the complexity of managing certificate pinning by providing the CPL 105 from a trusted authority (e.g., the authoritative server 130). In some examples, the certificates of the CPL 105 include one or more of X.509 certificates, non-X.509 certificates such as but not limited to, Public Key Cryptography Standards (PKCS) certificates, PKCS#12 (PFX) certificates, Pretty Good Privacy (PGP) certificates, and so on. In further examples, while the CPL 105 is described to include certificates through the disclosure, the CPL 105 can also include raw public keys instead of certificates that are associated with or include the raw public keys. In that regard, the CPL 105 can also be a public key pinning list. In still further examples, the CPL 105 can include a link to one or more certificate repositories. The certificate repository can be a certificate storage (e.g., a database, a server, a cloud storage, and so on) that stores certificates identified by the CPL 105, where the certificate repository is different (e.g., residing on a different network node) from the authoritative server 130. The client system 110 can connect to the certificate repositories identified in the CPL 105 and receive those certificates from those certificate repositories.

In some arrangements, the CPL 105 has a time-to-live (TTL) value (e.g. 24 hours, 2 hours, 10 minutes, and so on), such that when the TTL value indicates that the CPL 105 has expired, the certificates included in the CPL 105 can no longer be used by the client system 110 for transaction(s) being processed by the client system 110. In some arrangements, each entry (e.g., each certificate) included in the CPL 105 has a TTL value (e.g. 24 hours, 2 hours, 10 minutes, and so on), such that when the TTL value indicates that an entry in the CPL 105 has expired, the certificate(s) corresponding to that entry can no longer be used by the client system 110 for transaction(s) being processed by the client system 110. The client system 110 can request a new CPL 105 from the authoritative server 130. In some arrangements, the TTL value of the CPL 105 or an entry in the CPL 105 can be different from the actual validity period of the certificates included in the CPL 105 or in the entry of the CPL 105. For example, the CPL 105 can contain an X.509 certificate that has a one-year validity period (i.e., the X.509 certificate is generated to be valid for one year). However, for the purposes of the CPL 105 relative to the transaction(s) being processed by the client system 110, the CPL 105 or the entry of the CPL 105 corresponding to the X.509 certificate may have a TTL of an hour, a day, a week, and so on, which is less than one year. That means that even though the X.509 certificate is still valid, the client system 110 may still need to request the X.509 certificate via requesting a new CPL 105, if the TTL for the previous CPL 105 or the TTL for the entry corresponding to the X.509 certificate has expired.

In some arrangements, the client system 110 can be any suitable computing device can implement certificate pinning and validation. For example, the client system 110 can run any client application that executes any protocol using certificates, where the client system 110 performs certificate pinning and validation. Examples of such protocol include but are not limited to, a key management mechanism (e.g., TLS for establishing session keys, CMS-based key management, and so on), digital signing (e.g., for legal documents, and so on), an authentication scheme, and so on. Examples of the client system 110 include but are not limited to, a mobile device, a smartphone, a tablet, a personal digital assistant, a laptop computer, a desktop computer, a server, a digital communication device, and so on.

In some arrangements, each of the host systems 120 (referred to as the host system 120) is associated with one or more certificates to be pinned and validated by the client system 110. In particular, the client system 120 needs to pin and validate a certificate (e.g., an X.509 certificate) associated with the host system 120 in order to use a public key of the certificate for a subsequent cryptographic process (e.g., a cryptographic process of a client application) executed on the client system 110, where the cryptographic process involves a service provided by the host system 120. Examples of the host system 120 include but are not limited to, a web server (running one or more TLS sites), a database, a software source (e.g., a server of the software manufacturer, a server of a software provider, and so on), a server of a code signer, and so on.

In some arrangements, a client application (e.g., a mobile application) of the client system 110 typically pins multiple certificates including but are not limited to, a TLS certificate for each of multiple TLS connections with the host systems 120, a certificate for each code signer, one or more certificates for other asymmetric cryptography and key management functions, and so on.

In some arrangements, the host systems 120 correspond to end points or service providers for a digital service provided by the host systems 120 to the client system 110, where each host system 120 performs an aspect or feature of the digital service. In one example, the digital service is a digital financial transaction (e.g., fund transfer from a first bank to a second bank, deposit fund to a bank, purchase of goods/services, and so on) performed using a mobile wallet application, an online banking application, a mobile shopping application, and so on of the client system 110. In performing a digital financial transaction, the multiple host systems 120 (e.g., TLS site) are connected to the client system 110 via TLS connections. The certificates (e.g., the TLS certificates) for some of the multiple host systems 120 may not be known in advance, or the original certificates for some of the multiple host systems 120 may have expired such that new, unknown certificates need to be re-pinned by the client system 110. In other examples, the host systems 120 represent any suitable servers or systems with which the client system 110 communicates based on certificates in the manner described herein.

In some arrangements, the authoritative server 130 is a trusted authority that can provide the CPL 105 to the client system 110 via a suitable network. That is, the authoritative server 130 is trusted by the client system 110 and the host systems 120 to perform vetting and due diligence of certificates upon which the client system 110 relies to ensure that the certificates included in the CPL 105 are currently associated with the host systems 120 (at the time that the certificates are used for validation). In some instances, the authoritative server 130 is under service-level agreements (SLAs) with the host systems 120 and/or the client system 110 to guarantee that the certificates included in the CPL 105 are vetted, up-to-date pinned certificates associated with the host systems 120. In that regard, the authoritative server 130 can be communicably coupled to the host systems 120 via any suitable network such that when certificates (e.g., the EE certificates) need to be pinned or re-pinned, the authoritative server 130 can receive the certificates (from the host systems 120 or another suitable CA) and vets the certificates. After the certificates are vetted, the authoritative server 130 can distribute the certificates in the CPL 105 in the manner described. Accordingly, the authoritative server 130 managing the pinning and re-pinning of certificates on behalf of the client system 110 such that the client system 110 no longer needs to pin any certificates in the SDLC.

In some arrangements, the authoritative server 130 can be a system or server that provides information regarding service providers (e.g., the host systems 120) for digital services. The client system 110 can initiate a digital service. Examples of initiating a digital service include but are not limited to, launching a mobile application, executing a signed software (code), establishing a TLS connection, initiating a digital financial transaction, and so on. In response to the client system 110 initiating a digital service, the client system 110 connects to the authoritative server 130 and sends a digital service request to the authoritative server 130. The digital service request identifies aspects of the digital service such as but not limited to, an identifier for the client system 110, an identifier for a user account that is making the digital service request, an identifier for the digital service, an identifier for an operating system (OS) of the client device 110, an identifier for a payment network (in relation to the digital financial transaction), and so on.

Responsive to receiving the digital service request, the authoritative server 130 identifies the host systems 120 that can facilitate the digital service corresponding to the digital service request. In some examples, the authoritative server 130 can identify servers or systems (e.g., the host systems 120) to which the client system 110 needs to connect for the digital service. In other words, the authoritative server 130 can re-direct the client system 110 to connect with the appropriate host systems 120 for rendering the digital service. In that regard, the authoritative server 130 stores information (e.g., a table, mapping, and so on) that allows the authoritative server 130 to map specific service providers (e.g., the host systems 120) to a particular digital service request, based on the aspects of the digital service. Without the authoritative server 130, in some examples, the client system 110 may not have knowledge of the identities of the host systems 120 that the client system 110 needs to connect for the digital service. The authoritative server 130 can send host system identifiers (identifying the host systems 120 to which the client system 110 needs to connect) to the client system 110. Examples of the identifiers for the host systems 120 include but are not limited to domain names, web addresses (such as but not limited to, uniform resource locators (URLs), uniform resource identifiers (URIs), etc.), static Internet Protocol (IP) addresses, port numbers (as various protocols such as but not limited to, TLS and Simple Network Management Protocol (SNMP) run on specific port numbers), and so on.

In the examples in which the authoritative server 130 can identify the host systems 120 for the client system 110 to connect relative to the digital service, efficiency can be improved if the authoritative server 130 can also provide the CPL 105, which is a list of current pinned certificates of the host systems 120. That is, a same entity (the authoritative server 130) can both re-direct the connections for the digital service and provide certificates needed by the digital service. Thus, in some examples, in response to receiving the digital service request, the authoritative server 130 can send both of the identifiers for the host systems 120 and the CPL 105 together to the client system 110.

While one authoritative server 130 is shown, multiple authoritative servers (each of which can be a server such as but not limited to, the authoritative server 130) can be communicably coupled to the client system 110 via one or more suitable networks to provide CPLs (and host system identifiers in some examples). The different authoritative servers can provide the CPLs (and the host system identifiers) specific to one or more aspects of the digital service. In some arrangements, the different authoritative servers can provide the CPLs (and the host system identifiers) specific to different payment networks (e.g., MasterCard®, Visa®, and so on), different OSs (e.g., iOS®, Android®, Microsoft®, Linux®, Unix®, zOS®, and so on) for mobile, midrange, and mainframe implementations, different online or digital merchants/stores, different URLs, different products, and so on.

As described, the authoritative server 130 is communicably coupled to the client system 110 via a suitable network. The authoritative server 130 is communicably coupled to the host systems 120 via one or more suitable networks. The client system 110 is communicably coupled to the host system 120 via a suitable network. Each of the aforementioned networks can be any suitable Local Area Network (LAN), Wide Area Network (WAN), the Internet, an external network, an internal network, or a combination thereof. For example, Each of the aforementioned networks can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. Each of the aforementioned networks is structured to permit the exchange of data, values, instructions, messages, and the like.

Figure 2A:
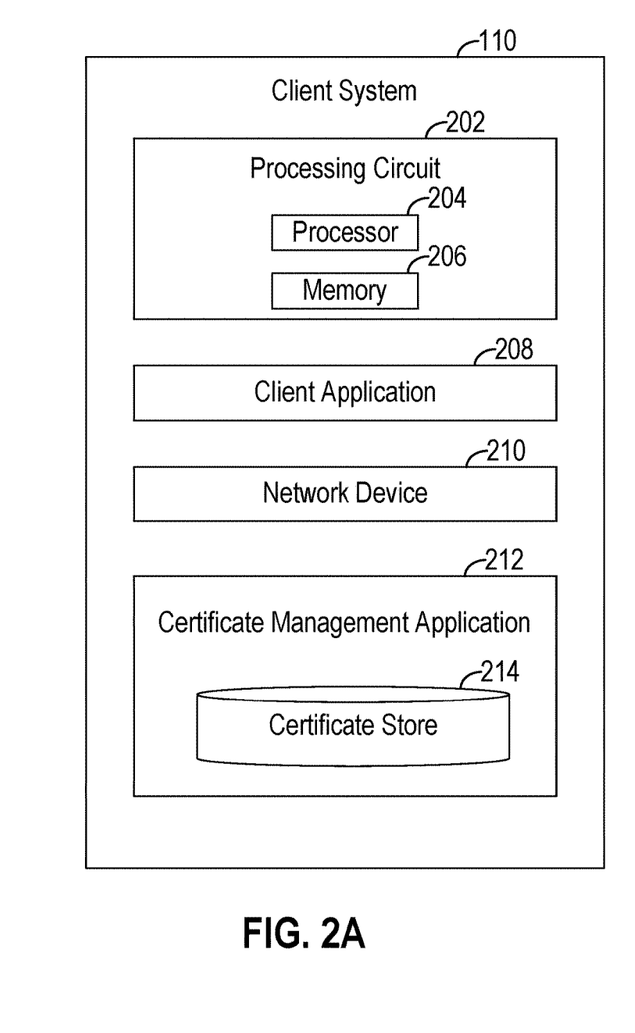
FIG. 2A is a schematic block diagram illustrating the client system (shown in FIG. 1), according to some arrangements.
Figure 2B:
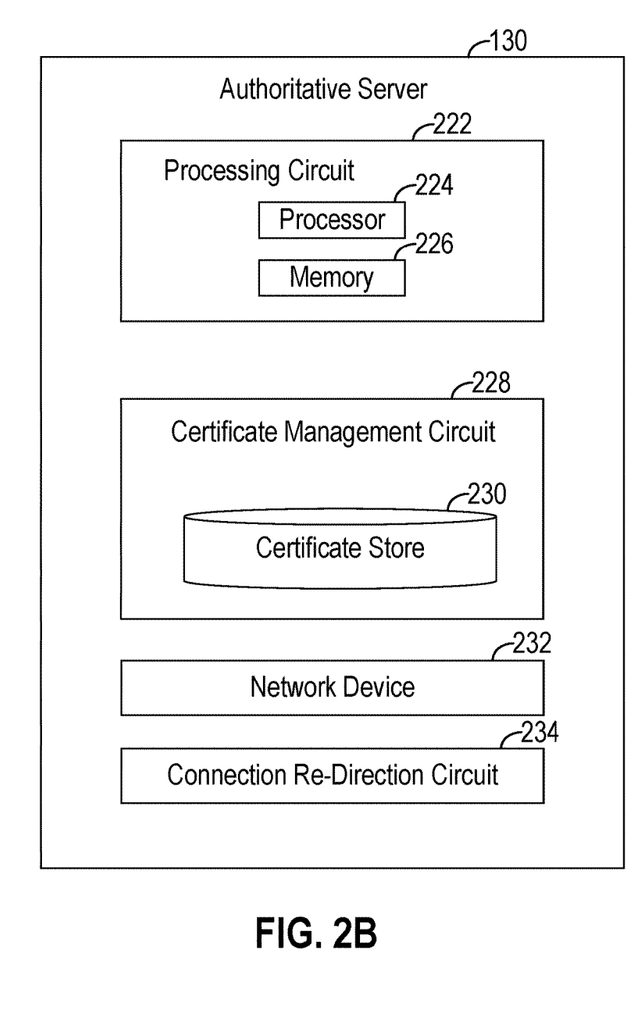
FIG. 2B is a schematic block diagram illustrating the authoritative server (shown in FIG. 1), according to some arrangements.

FIG. 2A is a schematic block diagram illustrating the client system 110 (FIG. 1), according to some arrangements. FIG. 2B is a schematic block diagram illustrating the authoritative server 130 (FIG. 1), according to some arrangements. Referring to FIGS. 1-2B, the client system 110 is shown to include various circuits and logic for implementing the operations described herein. More particularly, the client system 110 includes a processing circuit 202, a client application 208, a network device 210, a certificate management application 212, and a certificate store 214. While various circuits, interfaces, applications, and logic with particular functionality are shown, it should be understood that the client system 110 includes any number of circuits, interfaces, applications, and logic for facilitating the operations described herein. For example, the activities of multiple circuits can be combined as a single circuit and implemented on a same processing circuit (e.g., the processing circuit 202), as additional circuits with additional functionality are included.

In some arrangements, the processing circuit 202 includes a processor 204 and a memory 206. The processor 204 can be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 206 stores data and/or computer code for facilitating the various processes described herein. The memory 206 can be implemented as Random Access Memory (RAM), Read-Only Memory (ROM), Non-volatile RAM (NVRAM), Flash Memory, hard disk storage, and the like. Moreover, the memory 206 is or includes tangible, non-transient volatile memory or non-volatile memory. Accordingly, the memory 206 includes database components, object code components, script components, or any other type of information structure for supporting the various activities and information structures described herein.

The client application 208 is an application, program, process, software(code), or the like that can execute any protocol using certificates of the host systems 120. The client application 208 need certificate pinning and validation to use the certificates (e.g., public keys thereof) of the host systems 120 in subsequent cryptographic processes of the client application 208. Examples of the protocol (corresponding to the cryptographic processes) include but are not limited to, a key management mechanism (e.g., TLS for establishing session keys, CMS-based key management, and so on), digital signing (e.g., for legal documents, and so on), an authentication scheme, and so on. Examples of the client application 208 include but are not limited to, a server application, a mobile application, a browser, signed software (code), and so on. The client application 208 can be executed by the processing circuit 202.

The network device 210 is configured for and structured to communicate data with the authoritative server 130 and the host systems 120 over the networks. The network device 210 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The certificate management application 212 manages certificate pinning and certificate validation for the client system 110 (e.g., for at least the client application 208). For example, the certificate management application 212 can pin and validate the authoritative server certificate, request the CPL 105, verify the cryptographic signature of the received CPL 105, decrypt the received CPL 105, and so on. The certificate management application 212 can be executed by the processing circuit 202.

In some arrangements, the certificate management application 212 includes or is operatively coupled to a certificate store 214. The certificate store 214 is a memory device (e.g., a database) that stores pinned certificates of the host systems 120. In some examples, the certificate store 214 can store the pinned certificates included in the received CPL 105 to be used in the subsequent cryptographic processes of the client application 208. In some examples, expired certificates stored in the certificate store 214 can be updated and replaced with new pinned certificates included in the received CPL 105.

The authoritative server 130 is shown to include various circuits and logic for implementing the operations described herein. More particularly, the authoritative server 130 includes a processing circuit 222, a certificate management circuit 228, a certificate store 230, a network device 232, and a connection re-direction circuit 234. While various circuits, interfaces, applications, and logic with particular functionality are shown, it should be understood that the authoritative server 130 includes any number of circuits, interfaces, applications, and logic for facilitating the operations described herein. For example, the activities of multiple circuits can be combined as a single circuit and implemented on a same processing circuit (e.g., the processing circuit 222), as additional circuits with additional functionality are included.

In some arrangements, the processing circuit 222 has a processor 224 and a memory 226. The processor 224 can be implemented as a general-purpose processor, an ASIC, one or more FPGAs, a DSP, a group of processing components, or other suitable electronic processing components. The memory 226 stores data and/or computer code for facilitating the various processes described herein. The memory 226 can be implemented as RAM, ROM, NVRAM, Flash Memory, hard disk storage, and the like. Moreover, the memory 226 is or includes tangible, non-transient volatile memory or non-volatile memory. Accordingly, the memory 226 includes database components, object code components, script components, or any other type of information structure for supporting the various activities and information structures described herein.

The certificate management circuit 228 manages pinned certificates of host systems (including the host systems 120) on behalf of client systems such as but not limited to, the client system 110. In some arrangements, the certificate management circuit 228 includes or is operatively coupled to a certificate store 230. The certificate store 230 is a memory device (e.g., a database) that stores pinned certificates of the host systems (including the host systems 120). The certificate management circuit 228 (automatically or based at least partially on human input) performs vetting and due diligence of certificates of the host systems 120 upon which the client system 110 relies to ensure, in real-time, that the certificates stored in the certificate store 230 associated with the host systems 120 are up-to-date.

In some arrangements, the certificate management circuit 228 can be communicably coupled to the host systems 120 and receive the certificates of the host systems 120 from the host systems 120 or another suitable CA. In one example, the certificate management circuit 228 can receive certificates of all of the host systems 120 (e.g., TLS sites, software sources, and so on) to which the client system 110 (e.g., the client application 208) can potentially connect, where the certificates of all of the host systems 120 may not be known to the client system 110 in advance, especially in the scenario in which the client system 110 relies on the authoritative server 130 (e.g., the connection re-direction circuit 234) for connection re-direction and does not know the identities of the host systems 120 before requesting the same from the connection re-direction circuit 234. In another example, the certificate management circuit 228 can receive a new certificate of one of the host systems 120 (e.g., a TLS site, a software source, and so on) replacing an expired certificate, where the new certificate may not be known to the client system 110 in advance. In yet another example, the certificate management circuit 228 can receive a certificate for a new host system (e.g., a new service provider, a new software source, and so on) as an original host system (e.g., an original service provider, an original software source, and so on) have changed for a digital service (e.g., a TLS site, a signed software, and so on), where the new certificates may not be known to the client system 110 in advance.

In some arrangements, in response to a host system replacing an expired certificate with a new certificate or in response to a new host system becomes operational relative to a digital service, the host system pushes a new certificate to the authoritative server 130, in real time. The certificate management circuit 228 can then pin the new certificate by vetting the new certificate. After the certificates are vetted, the certificate management circuit 228 can store the vetted certificates in the certificate store 230 and/or distribute the vetted certificates as the CPL 105 in the manner described. In this regard, the certificate management circuit 228 can maintain an up-to-date list of current, pinned certificates on behalf of the client system 110, such that the certificate management circuit 228 can provide any pinned certificate to the client system 110 in the CPL 105. The client system 110 need to go to only one trusted source (the authoritative server 130) for all certificates needed by the client application 208. The certificate management circuit 228 can be implemented by the processing circuit 222.

The network device 232 is configured for and structured to communicate data with the client system 110 and the host systems 120 over the networks. The network device 232 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The connection re-direction circuit 234 can be executed by the processing circuit 222. The connection re-direction circuit 234 can re-direct the client system 110 to connect with the appropriate host systems 120 for rendering the digital service. In that regard, the re-direction circuit 234 stores information (e.g., a table, mapping, and so on) that allows the re-direction circuit 234 to map specific service providers (e.g., the host systems 120) to a particular digital service request, based on the aspects of the digital service in the manner described. Without the re-direction circuit 234, in some examples, the client system 110 may not have knowledge of the identities of the host systems 120 that the client system 110 needs to connect for the digital service. The re-direction circuit 234 can send the host system identifiers (identifying the host systems 120 to which the client system 110 needs to connect) to the client system 110.

Figure 3:
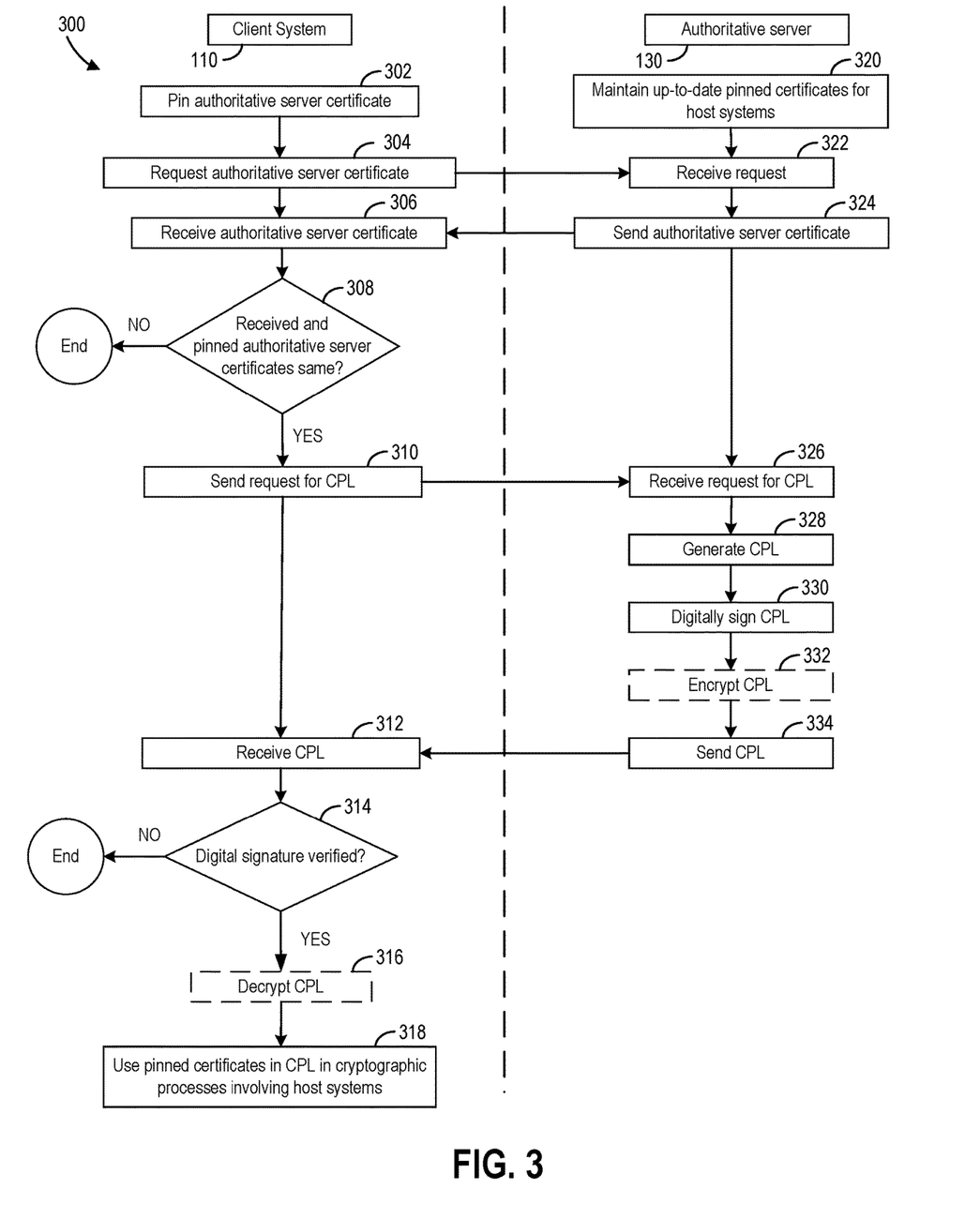
FIG. 3 is a flow diagram illustrating a method for managing certificate pinning in real-time, according to some arrangements.

FIG. 3 is a flow diagram illustrating a method 300 for managing certificate pinning in real-time, according to some arrangements. Referring to FIGS. 1-3, the method 300 can be performed by at least the client system 110 (the blocks for which are shown left of the dashed line in FIG. 3) and the authoritative server 130 (the blocks for which are shown right of the dashed line in FIG. 3).

At 320, the certificate management circuit 228 maintains up-to-date pinned certificates for the host systems 120 in the manner described. The up-to-date pinned certificates can be stored in the certificate store 230. All certificates associated with the host systems 120, any new certificates replacing expired certificates for the existing host systems 120, any new certificates for the new host systems 120 that become online/operational for the first time relative to a digital service, and any other types of updates to the certificates of the host systems 120 can be pushed or sent by the host systems 120 or a suitable CA associated therewith to the authoritative server 130 immediately after such certificates are generated by the host systems 120 or the associated CA. Alternatively, the certificate management circuit 228 can request the host systems 120 and known CAs associated therewith periodically (e.g., hourly, daily, weekly, monthly, quarterly, semi-annually, or annually) for new certificates, and can receive such certificates as a response from the host systems 120 and known CAs.

The certificate management circuit 228 can then pin the received certificates by vetting the certificates in the manner described. Responsive to the certificates being vetted, the certificate management circuit 228 stores the vetted certificates in the certificate store 230. Block 320 can be executed by the certificate management circuit 228 and the certificate store 230 constantly and dynamically to ensure that all certificates stored in the certificate store 230 are currently pinned to the host systems 120 at any time.

At 302, the certificate management application 212 pins one or more authoritative server certificates of the authoritative server 130. In other words, the certificate management application 212 associates the authoritative server certificates with the authoritative server 130 at 302. In some arrangements, the authoritative server certificates can be pinned at development time (e.g., within the SDLC) of the certificate management application 212, such that the authoritative server certificates are preloaded or embedded in the certificate management application 212 upon being deployed (downloaded and installed) in the client system 110. In other arrangements, the certificate management application 212 can pin the one or more authoritative server certificates upon first encountering the authoritative server certificates and can pin updates to the authoritative server certificates in any suitable manner. The authoritative server certificates that have been pinned are referred to as "pinned authoritative server certificates."

At 304, the certificate management application 212 can request one or more authoritative server certificates from the authoritative server 130 to validate the authoritative server 130. In some arrangements, requesting the one or more authoritative server certificates to validate the authoritative server 130 at 304 indicates that the client system 110 may need the CPL 105 in connection with the client application 208 (e.g., for a digital service) in the manner described.

In some examples, the certificate management application 212 can send the request for the one or more authoritative server certificates at 304 in response to the client application 208 initiating a digital service such as but not limited to, launching a mobile application (the client application 208), executing a signed software (code) of the client application 208, establishing one or more TLS connections by the client application 208, initiating a digital financial transaction by the client application 208, and so on. As described, to successfully run or execute the digital service, the client application 208 may need to connect to the host systems 120 and use the certificates of the host systems 120 in cryptographic processes involving the host systems 120.

In some examples, the certificate management application 212 can send the request for the one or more authoritative server certificates at 304 periodically to make sure that the pinned certificates associated with the host systems 120 that are stored in the certificate store 214 are up-to-date, without regard of whether the client application 208 initiates a digital service. The certificate management application 212 can send the request for the one or more authoritative server certificates at 304 every minute, every hour, every day, every week, every month, every year, and so on.

In some examples, the certificate management application 212 can send the request for the one or more authoritative server certificates at 304 responsive to receiving a notification (not shown) from the certificate management circuit 228, without regard of whether the client application 208 initiates a digital service. The certificate management circuit 228 may send the notification in response to pinning one or more new certificates from the host systems 120 or storing the pinned new certificates in the certificate store 230. The new certificates may need to be pushed to the client system 110 for replacing expired certificates or for adding certificates for new host systems 120. In some examples, the certificate management circuit 228 sends the notification in response to determining that a predetermined number (e.g., 5, 10, 20, and so on) of pinned new certificates need to be pushed to the client system 110. In some arrangements, the notification can include the authoritative server certificates (e.g., at 324), such that blocks 304, 322, and 306 can be omitted.

At 322, the certificate management circuit 228 receives the request for the one or more authoritative server certificates from the client system 110. At 324, the certificate management circuit 228 sends the one or more authoritative server certificates to the client system 110. At 306, the certificate management application 212 receives the authoritative server certificates from the authoritative server 130. The authoritative server certificates that have been received by the certificate management application 212 are referred to as "received authoritative server certificates."

In some examples, the authoritative server certificates are a type of certificates dedicated to validating the authoritative server 130 for the transmission of the CPL 105 to the client system 110. A new type of dedicated certificates (e.g., the dedicated authoritative server certificates) can be created by setting a value in a key usage field or object identifier of a certificate to indicate that a key associated with the certificate cannot be used for anything else other than for the validating the authoritative server 130 for the transmission of the CPL 105 to the client system 110, e.g., such certificate cannot be accepted for any other purposes.

Alternatively, the authoritative server certificates can correspond to a TLS certificate with CPL capabilities. That is, a new key usage field or a new object identifier can be created in a TLS certificates to indicate that a key associated with the TLS certificates can be used for validating the authoritative server 130 for the transmission of the CPL 105 to the client system 110 (e.g., the TLS certificate can also function like an authoritative server certificate), in addition to key management and digital key signature capabilities of the TLS certificate.

At 308, the certificate management application 212 validates the received authoritative server certificates by determining whether the received authoritative server certificates are the same as the pinned authoritative server certificates associated with the authoritative server 130. In response to determining that the received authoritative server certificates are not the same as the pinned authoritative server certificates (308:NO), validation fails and the method 300 ends. On the other hand, in response to determining that the received authoritative server certificates are the same as the pinned authoritative server certificates (308:YES), validation is successful, and the certificate management application 212 sends a request for the CPL 105 at 310. In some examples, the request for the CPL 105 is merely a "certificate validation success" message (e.g., where blocks 304, 322, 306, 324, 308, and 310 are part of a handshake process between the client system 110 and the authoritative server 130). In some examples, a secure communication channel, link, or session (e.g., a TLS session) is established between the client system 110 and the authoritative server 130 responsive to successful validation (308:YES), such that subsequent sensitive data (e.g., sending and receiving the CPL 105) can be communicated via the secure communication, channel, link, or session.

At 326, the certificate management circuit 228 receives the request for the CPL 105. At 328, the certificate management circuit 228 generates the CPL 105 requested by the certificate management application 212. The certificate store 230 may store the pinned certificates of a large number of host systems, including the host systems 120 and other host systems. In generating the CPL 105, the certificate management circuit 228 identifies requested pinned certificates from all the pinned certificates stored in the certificate store 230 and aggregates the requested pinned certificates to generated the CPL 105.

In that regard, similar to the digital service request, the request for the CPL 105 can also include identification information regarding aspects of the digital service such as but not limited to, an identifier for the client system 110, an identifier for a user account that is making the digital service request, an identifier for the digital service, an identifier for an OS of the client device 110, an identifier for a payment network (in relation to the digital financial transaction), and so on. Responsive to receiving the request for the CPL 105, the certificate management circuit 228 identifies the host systems 120 and certificates associated thereof that can facilitate the digital service corresponding to the request for the CPL 105. In some examples, the authoritative server 130 can identify the host systems 120 to which the client application 208 needs to connect for the digital service. The certificate management circuit 228 can store information (e.g., a table, mapping, and so on) that allows the certificate management circuit 228 to map specific host systems 120 to the request for the CPL 105, based on the aspects of the digital service. Based on such information, the certificate management circuit 228 can identify the host systems 120 and pinned certificates associated thereof. In some examples, the request for the CPL 105 and the digital service request can be combined into a single request which includes an indication that the CPL 105 is requested, an indication that the host system identifiers are requested, and the aspects of the digital service.

Alternatively, in some examples in which the certificate management application 212 can send the request for the one or more authoritative server certificates at 304 without regard of whether the client application 208 initiates a digital service, the request for the CPL 105 can include identification information regarding aspects of all digital services of the client application 208. The certificate management circuit 228 can identify the host systems 120 and pinned certificates associated thereof based on the aspects in the manner described, to determine whether new certificates are needed to replace existing certificates or for new host systems relative to all digital services of the client application 208.

At 330, the certificate management circuit 228 digitally signs the CPL 105. Optionally, at 332, the certificate management circuit 228 encrypts the CPL 105. In some examples, the CPL 105 can further include one or more trusted time stamps or time stamp tokens (TSTs) per the X9.95 standard for data integrity. The one or more trusted time stamps can be verifiably linked to a time stamp authority (TSA).

At 334, the certificate management circuit 228 can send the CPL 105 to the certificate management application 212. In some arrangements, the certificate management circuit 228 can send the host system identifiers with the CPL 105 to the client system 110.

At 312, the certificate management application 212 receives the CPL 105. At 314, the certificate management application 212 verifies the cryptographic signature of the CPL 105. In response to determining that the cryptographic signature of the CPL 105 is not verified (314:NO), the method 300 ends. On the other hand, in response to determining that the cryptographic signature of the CPL 105 is verified (314:YES), the certificate management application 212 may optionally decrypt the CPL 105 at 316 and use the pinned certificates included in the CPL 105 in cryptographic processes involving the host systems 120 at 318. Alternatively, in response to determining that the cryptographic signature of the CPL 105 is verified (314:YES), the certificate management application 212 uses the pinned certificates included in the CPL 105 in cryptographic processes involving the host systems 120 at 318 without decrypting (if the CPL 105 is not encrypted). The pinned certificates included in the CPL 105 can be stored in the certificate store 214 for later use.

For example, before a TLS connection can be established between the client application 208 and each of the host systems 120 (e.g., web servers), the client application 208 receives a TLS certificate of each of the host systems 120 from each of the host systems 120 and compares the received TLS certificate with a corresponding pinned certificate for that host system 120, where the pinned certificate is stored in the certificate store 214 and received in the CPL 105. In response to determining that the received TLS certificate is the same as the pinned TLS certificate, the received TLS certificate is validated. In response to validating the received TLS certificate, the client application 208 connects to only that particular host system 120 via the TLS connection, and the public key of the received TLS certificate is used for cryptographic processes in relation to the TLS connection. As an example, the client application 208 can use the public key of a TLS certificate to decrypt data received by the client application 208 from the host system 120 via the TLS connection.

In another example in which the client application 208 corresponds to signed software (code), before the client application 208 can be executed, the client application 208 receives a code signing certificate from the host system 120 (e.g., a software source) and compares the received code signing certificate with a pinned certificate, where the pinned certificate is stored in the certificate store 214 and received in the CPL 105. In response to determining that the received code signing certificate is the same as the pinned certificate, the received code signing certificate is validated. In response to validating the received code signing certificate, the client application 208 can be executed on the client system 110.

In some arrangements, the certificate management application 212 can use the validated authoritative server certificates to verify the cryptographic signature of the CPL 105 (signed at 330). For example, the certificate management circuit 228 can digitally sign the CPL 105 using the private key of the authoritative server 130. The certificate management application 212 can verify the cryptographic signature using a public key associated with the authoritative server certificates, which are validated at 308. The public key corresponds to the private key used to sign the CPL 105 at 330. The public key and the private key are a key pair generated using any suitable algorithms such as but not limited to, Rivest-Shamir-Adleman (RSA), Digital Signature Algorithm (DSA), Elliptic Curve Digital Signature Algorithm (ECDSA), and so on.

In some arrangements, in addition to verifying the cryptographic signature of the CPL 105, the certificate management application 212 can also use the validated authoritative server certificates to decrypt the CPL 105 (optionally encrypted at 332).

In some arrangements, the CPL 105 can be encrypted (optionally, at 332) and decrypted (optionally, at 316) using a symmetric key or an asymmetric key. The CPL 105 can be encrypted at 332 using a symmetric key and decrypted at 316 using the symmetric key. In some arrangements, the symmetric keys can be provided (e.g., generated and distributed) using a key transport scheme defined in X9.73 CMS, a key agreement scheme defined in X9.73 CMS, or a PKS scheme. In some examples, the symmetric key can be established using an asymmetric cryptography scheme such as but not limited to, the key transport scheme (e.g., RSA) or key agreement (e.g., Diffie-Hellman key exchange (DH),
Elliptic-curve Diffie-Hellman (ECDH), and so on) per X9.73 CMS. In some examples, the symmetric key can be established using a pre-shared key (PSK) scheme, where the symmetric key is arranged using any suitable mechanism. In some arrangements, the asymmetric keys associated with the validated authoritative server certificates are PQC algorithms. In some arrangements, the symmetric key is a PQC algorithm.

In the examples in which the certificate management application 212 sends the request for the one or more authoritative server certificates at 304 periodically to make sure that the pinned certificates associated with the host systems 120 that are stored in the certificate store 214 are up-to-date (without regard of whether the client application 208 initiates a digital service), the CPL 105 may not be send responsive to every request. For example, a digital signature (verified at 314) of the CPL 105 previously received by the certificate management application 212 or a hash of the previous CPL 105 can be included in the request for a new CPL 105 (e.g., at 310). The certificate management circuit 228 can use the digital signature or the hash to identify the previous CPL 105 and determines whether there has been any updates (e.g., new certificates for expired certificates, new certificates for new host systems 120, and so on) to the pinned certificates included in the previous CPL 105. In that regard, the certificate management circuit 228 can store previous CPLs 105 and associated digital signature/hash. In response to determining that there has not been any updates to pinned certificates included in the previous CPL 105, the certificate management circuit 228 recognizes that that the certificate management application 212 has the up-to-date pinned certificates and notifies the certificate management application 212 of the same. On the other hand, in response to determining that there has been updates (e.g., at least one new certificate) that needs to be pushed to the certificate management application 212, the certificate management circuit 228 sends a new CPL 105 to the certificate management application 212. In some examples, the new CPL 105 includes all pinned certificates for the client application 208 (including the at least one new certificate and the certificates included in the previous CPL 105). In other examples, the new CPL 105 includes only the at least one new certificate (e.g., delta updates). In the scenario in which the new certificate replaces an old certificate, the certificate management circuit 228 instructs the certificate management application 212 to delete the old certificate from the certificate store 214.

As described, in some arrangements, the CPL 105 has a TTL value or parameter (e.g. 24 hours, 2 hours, 10 minutes, and so on), such that when the TTL value indicates that the CPL 105 has expired, the certificates included in the CPL 105 can no longer be used by the client system 110 for transaction(s) for digital services being processed by the client system 110. In some arrangements, each entry (e.g., each certificate) included in the CPL 105 has a TTL value (e.g. 24 hours, 2 hours, 10 minutes, and so on), such that when the TTL value indicates that an entry in the CPL 105 has expired, the certificate(s) corresponding to that entry can no longer be used by the client system 110 for transaction(s) for digital services being processed by the client system 110. The client system 110 can request a new CPL 105 from the authoritative server 130 in response to determining that the CPL 105 or an entry in the CPL 105 has expired or in response to determining that a certificate in the expired CPL 105 or a certificate in an expired entry is needed for a transaction of the client system 110. In some arrangements, the TTL value of the CPL 105 or an entry in the CPL 105 can be different from the actual validity period of the certificates included in the CPL 105 or in the entry of the CPL 105 in the manner described. Accordingly, the client system 110 does not reuse a stale CPL that is expired (according to the TTL value) and fetches a current version of that CPL.

Given that the client system 110 only needs the authoritative server certificates to obtain the CPL 105 without having to pin/re-pin each of the (already pinned) certificates of the host systems 120 that are in the CPL 105, the authoritative server certificates are the only primary pinned certificates needed by the client system 110 to obtain the pinned certificates of the host systems 120. The method 300 eliminates the need for the client system 110 to pin certificates within the SDLC of the client application 208 or to embed a build-in list of certificates for the client application 208.

In some arrangements, the CPL 105 can be a list of lists. For example, the CPL 105 can include the pinned certificates managed by the authoritative server 130 (e.g., stored in the certificate store 230) as well as at least an address (e.g., URL) to a second authoritative server (similar to the authoritative server 130) that stores additional pinned certificates (in connection with the client application 208). The client application 208, upon receiving the CPL 105, connects to the second authoritative server using the address and requests the second authoritative server for a second CPL 105 that includes the additional pinned certificates. The list can be chained or cascaded down, for example, where the second CPL 105 can include at least an address (e.g., URL) to a third authoritative server (similar to the authoritative server 130) that stores more pinned certificates in connection with the digital request, and so on. This allows multiple authoritative servers 130 to service the client application 208.

In some examples, the request at 310 can be digitally signed by the certificate management application 212 such that the certificate management circuit 228 can verify the client system 110 using the digital signature included in the request. The CPL 105 can be provided to the certificate management application 212 in response to verifying the digital signature of the client system 110.

In some arrangements, in order to conserve bandwidth and processing time, the certificate management circuit 228 can send identifiers for all pinned certificates requested by the client application 208 (e.g., at 310) instead of sending the pinned certificates themselves. Responsive to receiving the identifiers, the client application 208 determines whether the certificate store 214 already stores some or all of the certifies identified by the identifiers and responds to the certificate management circuit 228 with identifiers of the pinned certificates that that the certificate store 214 does not currently store. As such, an extra handshake takes place before block 334. The extra handshake overall consumes less bandwidth and time as compared to the bandwidth and time needed for transmitting all pinned certificates. Examples of the identifiers include but are not limited to, certificate names, thumbprints, and so on. Thumbprint is a string that uniquely identifies a certificate. The thumbprint can be a hash. For example, a certificate thumbprint is a SHA-1 hash (160-bits) of the certificate itself. An X.509 certificate contains a Subject Key Identifier (a SHA-1 hash of the subject public key) and an Authority Key Identifier (a SHA-1 hash of the CA certificate subject key used to verify the certificate signature).

When connecting to a TLS site, the TLS certificate needed for the connection includes the website name (e.g., URL) of the TLS site. An aspect of authentication and PKI includes name-matching the website name to which connection is requested with the website name included in the TLS certificate. In the examples in which a digital service connects to multiple TLS sites, each TLS site may have its own subdomain name. Traditionally, a wild-card (e.g., "*" in www.*.bankA.com) can be included in the website name in the TLS certificate such that any subdomain name under domain www.bankA.com automatically trusts the TLS certificate. Accordingly, the use of the wild-card poses security risk. Alternatively, another traditional method is including, in the TLS certificate, subject alternate names which are alternative domain/subdomain names corresponding to a digital service, even domain name is included in the digital service request. Given that the exact names are needed, if the subject alternate names are not updated frequently, domains/subdomains for a digital service may be missed. In addressing shortcomings of the wild-card implementation and the subject alternative names implementation, the CPL 105 as described herein includes all certificate that can be trusted for the domain and the subdomain for which connection is needed for a digital service. As new domains and subdomains become online for a digital service, the new certificates corresponding to such domains and subdomains can be pushed to the client system 110 via the CPL 105 in the manner described. As such, a list of pinned certificates for that digital service can always be up-to-date.

While the client application 208 and the host systems 120 are used as examples, arrangements disclosed herein can also be implemented for certificate pinning for any two entities for which certificates are needed for cryptographic processes therebetween. In particular, the arrangements disclosed herein can be implemented for operations that are server-to-server, server-to-database operations, mobile application-to-server, browser-to-server, and so on.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for managing certificate pinning for a client system, comprising:
   requesting, by the client system, a digital service request;
   receiving, by the client system from an authoritative server, a certificate pinning list (CPL), wherein the CPL is encrypted by the authoritative server, the CPL comprises a list of a plurality of pinned certificates, the plurality of pinned certificates is associated with a plurality of host systems different from the authoritative server, the plurality of pinned certificates and corresponding host systems of the CPL identified by the authoritative server to facilitate the digital service request, the CPL being updated by the authoritative server responsive to one or more of:
   a certificate associated with a host system of the plurality of host systems expiring,
   a new host system becoming operational relative to a digital service, or
   an update to the certificate associated with the host system of the plurality of host systems;

using, by the client system, the plurality of pinned certificates in cryptographic processes involving the identified host systems;

receiving, by the client system from the authoritative server, one or more received authoritative server certificates associated with the authoritative server;

determining, by the client system, that the one or more received authoritative server certificates are the same as one or more pinned authoritative server certificates associated with the authoritative server; and decrypting the CPL, wherein the CPL is encrypted and decrypted using a symmetric key or an asymmetric key based on a key transport scheme, and wherein the symmetric key or the asymmetric key is encrypted using Post-Quantum Cryptography (PQC).

2. The method of claim 1, wherein:

the CPL comprises a digital signature signed by the authoritative server; and the method further comprises verifying the digital signature using the one or more received authoritative server certificates.

3. The method of claim 1, wherein the one or more pinned authoritative server certificates are pinned within a software development lifecycle (SDLC) of a certificate management application deployed in the client system.

4. The method of claim 1, further comprising receiving, by the client system from the authoritative server, identifiers for the plurality of identified host systems corresponding to the digital service for the client system, wherein the identifiers comprises one or more of a domain names, uniform resource locators (URLs), uniform resource identifiers (URIs), Internet Protocol (IP) addresses, or port numbers.

5. The method of claim 1, wherein:

the plurality of pinned certificates correspond to a digital service executed by the client system; and the digital service executed by the client system comprises at least one of launching a mobile application, executing a signed software, establishing a transport layer security (TLS) connection, or initiating a digital financial transaction.

6. A method for managing certificate pinning for a client system, comprising:

maintaining, by an authoritative server, a plurality of pinned certificates, the plurality of pinned certificates is associated with a plurality of host systems different from the authoritative server, the authoritative server maintaining the plurality of pinned certificates by updating the plurality of pinned certificates responsive to one or more of:

a certificate associated with a host system of the plurality of host systems expiring, a new host system becoming operational relative to a digital service, or an update to the certificate associated with the host system of the plurality of host systems;

receiving, by the authoritative server from the client system, a digital service request from the client system;

identifying, by the authoritative server, one or more host systems of the plurality of host systems and corresponding pinned certificates configured to facilitate the digital service request;

sending, by the authoritative server to the client system, a certificate pinning list (CPL), wherein the CPL is encrypted by the authoritative server, the CPL comprises a list of the plurality of pinned certificates associated with the identified host systems of the plurality of host systems, wherein the client system uses the plurality of pinned certificates in cryptographic processes involving the identified host systems sending, by the authoritative server to the client system, one or more received authoritative server certificates associated with the authoritative server;

determining, by the client system, that the one or more received authoritative server certificates are the same as one or more pinned authoritative server certificates associated with the authoritative server; and decrypting the CPL, wherein the CPL is encrypted and decrypted using a symmetric key or an asymmetric key based on a key transport scheme, and wherein the symmetric key or the asymmetric key is encrypted using Post-Quantum Cryptography (PQC).

7. The method of claim 1, wherein the host systems identified by the authoritative server are not known by the client system.

8. The method of claim 1, wherein the host systems identified by the authoritative server direct the client system to connect with the host systems configured to render the digital service associated with the digital service request.

9. A non-transitory computer-readable medium storing computer-readable instructions such that, when executed, causes a processor of a client system to:

request a digital service request;

receive, from an authoritative server, a certificate pinning list (CPL), wherein the CPL is encrypted by the authoritative server, the CPL comprises a list of a plurality of pinned certificates, the plurality of pinned certificates is associated with a plurality of host systems different from the authoritative server, the plurality of pinned certificates and corresponding host systems of the CPL identified by the authoritative server to facilitate the digital service request, the CPL being updated by the authoritative server responsive to one or more of:

a certificate associated with a host system of the plurality of host systems expiring, a new host system becoming operational relative to a digital service, or an update to the certificate associated with the host system of the plurality of host systems;

use the plurality of pinned certificates in cryptographic processes involving the identified host systems;

receive, from the authoritative server, one or more received authoritative server certificates associated with the authoritative server;

determine that the one or more received authoritative server certificates are the same as one or more pinned authoritative server certificates associated with the authoritative server; and decrypt the CPL, wherein the CPL is encrypted and decrypted using a symmetric key or an asymmetric key based on a key transport scheme, and wherein the symmetric key or the asymmetric key is encrypted using Post-Quantum Cryptography (PQC).

10. The non-transitory computer-readable media of claim 9, wherein:

the CPL comprises a digital signature signed by the authoritative server; and the instructions further cause the processor of the client system to verify the digital signature using the one or more received authoritative server certificates.

11. The non-transitory computer-readable media of claim 9, wherein the one or more pinned authoritative server certificates are pinned within a software development lifecycle (SDLC) of a certificate management application deployed in the client system.

12. The non-transitory computer-readable media of claim 9, wherein:
the instructions further cause the processor of the client system to receive, from the authoritative server, identifiers for the plurality of identified host systems corresponding to the digital service for the client system; and
the identifiers comprises one or more of a domain names, uniform resource locators (URLs), uniform resource identifiers (URIs), Internet Protocol (IP) addresses, or port numbers.

13. The non-transitory computer-readable media of claim 9, wherein:
the plurality of pinned certificates correspond to a digital service executed by the client system; and
the digital service executed by the client system comprises at least one of launching a mobile application, executing a signed software, establishing a transport layer security (TLS) connection, or initiating a digital financial transaction.

14. The method of claim 6, further comprising signing, by the authoritative server, the CPL with a cryptographic signature, wherein the cryptographic signature is verified by the client system using the one or more received authoritative server certificates, the cryptographic signature is one of a digital signature, a Message Authentication Code (MAC), or a Hash-based Message Authentication Code (HMAC).

15. The method of claim 6, wherein the one or more pinned authoritative server certificates are pinned within a software development lifecycle (SDLC) of a certificate management application deployed in the client system.

16. The method of claim 6, further comprising sending, by the authoritative server to the client system, identifiers for the plurality of identified host systems corresponding to the digital service for the client system.

17. The method of claim 6, wherein:
the plurality of pinned certificates correspond to a digital service executed by the client system; and
the digital service executed by the client system comprises at least one of launching a mobile application, executing a signed software, establishing a transport layer security (TLS) connection, or initiating a digital financial transaction.

18. A non-transitory computer-readable medium storing computer-readable instructions such that, when executed, causes a processor of an authoritative server to:
maintain a plurality of pinned certificates, the plurality of pinned certificates is associated with a plurality of host systems different from the authoritative server, the authoritative server maintaining the plurality of pinned certificates by updating the plurality of pinned certificates responsive to one or more of:
a certificate associated with a host system of the plurality of host systems expiring,
a new host system becoming operational relative to a digital service, or
an update to the certificate associated with the host system of the plurality of host systems;
receive a digital service request from a client system;
identify one or more host systems of the plurality of host systems and corresponding pinned certificates configured to facilitate the digital service request;
send, to the client system, a certificate pinning list (CPL), wherein the CPL is encrypted by the authoritative server, the CPL comprises a list of the plurality of pinned certificates associated with the identified host systems of the plurality of host systems, wherein the client system uses the plurality of pinned certificates in cryptographic processes involving the identified host systems
receive, by the client system from the authoritative server, one or more received authoritative server certificates associated with the authoritative server;
determine, by the client system, that the one or more received authoritative server certificates are the same as one or more pinned authoritative server certificates associated with the authoritative server; and
decrypt the CPL,
wherein the CPL is encrypted and decrypted using a symmetric key or an asymmetric key based on a key transport scheme, and
wherein the symmetric key or the asymmetric key is encrypted using Post-Quantum Cryptography (PQC).

19. The non-transitory computer-readable media of claim 18, wherein the one or more pinned authoritative server certificates are pinned within a software development lifecycle (SDLC) of a certificate management application deployed in the client system.

20. The non-transitory computer-readable media of claim 18, wherein:
the plurality of pinned certificates correspond to a digital service executed by the client system; and
the digital service executed by the client system comprises at least one of launching a mobile application, executing a signed software, establishing a transport layer security (TLS) connection, or initiating a digital financial transaction.

* * * * *